US009434262B2

(12) United States Patent
Yuhara et al.

(10) Patent No.: US 9,434,262 B2
(45) Date of Patent: Sep. 6, 2016

(54) POWER-SOURCE APPARATUS FOR VEHICLE AND CONTROL METHOD OF THE SAME (71) Applicant: MAZDA MOTOR CORPORATION, Hiroshima (JP)

(72) Inventors: Masamitsu Yuhara, Hiroshima (JP); Katsumasa Yoshida, Hiroshima (JP); Kazuya Kotani, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 202 days.

(21) Appl. No.: 13/962,728

(22) Filed: Aug. 8, 2013

(65) Prior Publication Data
US 2014/0062414 A1    Mar. 6, 2014

(30) Foreign Application Priority Data

Aug. 30, 2012 (JP) .................. 2012-189615

(51) Int. Cl.
H02J 7/00 (2006.01)
B60L 11/18 (2006.01)
B60L 7/10 (2006.01)
(Continued)

(52) U.S. Cl.
CPC .............. *B60L 11/1809* (2013.01); *B60L 7/10* (2013.01); *B60L 11/1857* (2013.01); *B60L 11/1861* (2013.01); *H02J 7/1446* (2013.01); *H02J 7/1492* (2013.01); *H02J 7/345* (2013.01); *Y02T 10/705* (2013.01); *Y02T 10/7005* (2013.01); *Y02T 10/7044* (2013.01); *Y02T 10/92* (2013.01)

(58) Field of Classification Search
CPC .. B60L 11/1809; B60L 11/1857; B60L 7/10; B60L 11/1861; H02J 7/1446; H02J 7/345; H02J 7/1492; Y02T 10/705; Y02T 10/7044; Y02T 10/7005
See application file for complete search history.

(56) References Cited

U.S. PATENT DOCUMENTS 6,234,932 B1 * 5/2001 Kuroda et al. .................... 477/3
8,552,688 B2 10/2013 Ueda et al.
(Continued)

FOREIGN PATENT DOCUMENTS

DE  102009022831 A1  12/2009
DE  102010014104 A1  10/2011
(Continued)

OTHER PUBLICATIONS

An Office Action issued by the German Patent Office on Jun. 29, 2015, which corresponds to German Patent Application No. 102013014151.6 and is related to U.S. Appl. No. 13/962,728; with English language partial translation.
(Continued)

*Primary Examiner* — Nha Nguyen
(74) *Attorney, Agent, or Firm* — Studebaker & Brackett PC (57) ABSTRACT A power-source apparatus for a vehicle comprises a generator driven by an engine and generating power, a power-storage device storing the power generated by the generator thereat and supplying the power stored thereat to an electric load, and a control device configured to detect a deterioration state of the power-storage device and change a voltage of the power-storage device during a soak in accordance with the deterioration state of the power-storage device detected. Thereby, the improvement of the fuel economy can be achieved and also the necessary durability of the power-storage device can be ensured.

4 Claims, 5 Drawing Sheets (51) Int. Cl.
*H02J 7/14* (2006.01)
*H02J 7/34* (2006.01)

(56) References Cited

U.S. PATENT DOCUMENTS

| | | | |
|---|---|---|---|
| 2001/0042648 A1* | 11/2001 | Wakashiro et al. | 180/65.2 |
| 2009/0085401 A1* | 4/2009 | Inoue | 307/10.7 |
| 2009/0167216 A1* | 7/2009 | Soma et al. | 318/376 |
| 2009/0186247 A1* | 7/2009 | Hirakawa et al. | 429/23 |
| 2009/0230766 A1* | 9/2009 | Miyama et al. | 307/10.7 |
| 2009/0295399 A1 | 12/2009 | Ueda et al. | |
| 2010/0231178 A1* | 9/2010 | Handa et al. | 320/163 |
| 2011/0221400 A1* | 9/2011 | Takizawa et al. | 320/166 |
| 2012/0038327 A1* | 2/2012 | Yokoyama | 320/166 |
| 2012/0119574 A1* | 5/2012 | Sone et al. | 307/10.1 |
| 2014/0077771 A1* | 3/2014 | Yamashita et al. | 320/167 |
| 2015/0012175 A1* | 1/2015 | Hara et al. | 701/36 |

FOREIGN PATENT DOCUMENTS

| | | |
|---|---|---|
| JP | 2005-268122 A | 9/2005 |
| JP | 2007-124883 A | 5/2007 |
| JP | 2007-323999 A | 12/2007 |
| JP | 2009-286215 A | 12/2009 |
| JP | 2010-023766 A | 2/2010 |
| JP | 2012-132758 A | 7/2012 |
| WO | 2006/121005 A1 | 11/2006 |
| WO | 2011/124478 A2 | 10/2011 |

OTHER PUBLICATIONS

An Office Action; "Notice of Reasons for Rejection," issued by the Japanese Patent Office on Jan. 5, 2016, which corresponds to Japanese Patent Application No. 2012-189615 and and is related to U.S. Appl. No. 13/962,728.

* cited by examiner

POWER-SOURCE APPARATUS FOR VEHICLE AND CONTROL METHOD OF THE SAME

BACKGROUND OF THE INVENTION

The present invention relates to a power-source apparatus for a vehicle equipped with a generator and a control method of the same, and, in particular, to a power-source apparatus for a vehicle and a control method of the same which can provide a vehicle traveling having a high fuel economy at an initial use stage of a power source and also keep an appropriate vehicle-traveling state for a long use term of the vehicle.

Recent years, a vehicle, such as an automotive vehicle, which has a function of regenerating deceleration energy at a power-storage device, e.g., a capacitor, at the time of deceleration of the vehicle and utilizing the regenerated energy as a power supply to electric devices, in addition to improving combustion of an engine, reducing vehicle weight and so on, in order to improve the fuel economy (gas mileage), has been put to practical use.

The above-described capacitor, however, generally has a problem in that if the voltage of the capacitor at the time of storing the power is high, the capacitor deteriorates promptly, so that the capacity (i.e., the electrostatic capacity) of the capacitor decreases quickly.

Japanese Patent Laid-Open Publication No. 2005-268122, for example, shows a technology that when an electric system is stopped, the power required for a start of the electric system is set at a low voltage in accordance with a degree of deterioration of the capacitor, and this power for the start is stored at the capacitor in order to restrain progress of deterioration of the capacitor.

Meanwhile, a vehicle having an idling-stop function which is capable of automatically stopping an engine on a specified condition during a temporary stop for a traffic signal or the like in order to improve the fuel economy has been put to practical use. According to the vehicle having the idling-stop function, in the case of using the capacitor as a power-storage device, the more the power stored at the capacitor is, the longer the idling stop lasts, so that the fuel economy can improve properly.

However, in order to achieve the long-term idling-stop operation, it may be necessary that the voltage of the capacitor is set at a higher voltage and this voltage is stored previously during a soak where the vehicle is not used, for example. Therefore, the capacitor may deteriorate promptly, so that capacity of the capacitor may decrease quickly. Consequently, the necessary durability as the power-storage device of the vehicle may not be ensured.

SUMMARY OF THE INVENTION

An object of the present invention is to provide a power-source apparatus for a vehicle and a control method of the same which can properly improve the fuel economy by means of the idling stop, for example, and also ensure the necessary durability of the power-storage device (capacitor).

According to the present invention, there is provided a power-source apparatus for a vehicle, comprising a generator driven by an engine and generating power, a power-storage device storing the power generated by the generator thereat and supplying the power stored thereat to an electric load, and a control device configured to detect a deterioration state of the power-storage device and change a voltage of the power-storage device during a soak in accordance with the deterioration state of the power-storage device detected.

Herein, the above-described changing of the voltage of the power-storage device includes not only changing from a high voltage to a low voltage but also changing from a low voltage to a high voltage. Further, the above-described control device may change the voltage of the power-storage device based on a current deterioration state or a future deterioration state which is estimated from a history of the deterioration state so far. Also, the above-described soak means a state where a vehicle is stopped and its engine is stopped with an ignition turned OFF, so that substantially no charging/discharging of the power-storage device of the vehicle occurs (however, a small amount of electricity, such as an dark (idling) current may flow). (For example, the soak is a state where the vehicle is parked in a garage at night and kept unused until the next morning.)

According to the above-described present invention, the vehicle traveling having the high fuel economy can be properly provided by means of the idling stop, for example, at the initial use stage of the power source, and also after the voltage of the power-storage device is changed to a lower voltage, for example, in accordance with the deterioration state of the power-storage device, the necessary durability of the power-storage device can be properly ensured, so that the appropriate vehicle-traveling state can be kept for a long use term of the vehicle.

According to an embodiment of the present invention, the control device changes the voltage of the power-storage device during the soak from a high voltage to a low voltage when the deterioration state of the power-storage device detected is determined such that the power-storage device deteriorates. Thereby, any inappropriate progress of the deterioration of the power-storage device can be restrained properly by a simple manner of changing the voltage of the power-storage device during the soak from the high voltage to the low voltage.

According to another embodiment of the present invention, the power-source apparatus for a vehicle further comprises a DC/DC convertor coupled between the power-storage device and the electric load, wherein the DC/DC convertor is configured to be capable of supplying part of the power stored at the power-storage device to the electric load via the DC/DC convertor and adjusting the amount of the power supplied to the electric load, and the control device comprises a control unit which outputs, to the DC/DC convertor, a control signal for adjusting the amount of the power supplied to the electric load via the DC/DC convertor. Thereby, the above-described voltage changing of the power-storage device in accordance with the deterioration state of the power-storage device according to the present invention can be achieved by properly controlling of the DC/DC convertor.

According to another embodiment of the present invention, the power-storage device is a capacitor, and detection of the deterioration state of the capacitor by the control device is conducted based on the capacity of the capacitor which is measured every a specified period of time during the soak. Thereby, since the deterioration-state detection of the capacitor is achieved by utilizing the capacity of the capacitor, the detection can be easier.

According to another embodiment of the present invention, the detection of the deterioration state of the capacitor by the control device is achieved by estimating a deterioration state of the capacitor at the timing a next measuring of the capacity of the capacitor is conducted or at the timing a term of operation guarantee of the capacitor passes. Thereby, since the deterioration-state detection of the capacitor is achieved by the deterioration-state estimation of the capacitor at the next-measuring timing or at the capacitor's operation guarantee-term passing timing, the deterioration state of the capacitor can be detected properly accurately.

According to another embodiment of the present invention, the power-source apparatus for a vehicle further comprises a battery, wherein the power-storage device is coupled to a first circuit portion connecting the generator and the DC/DC convertor, the battery is coupled to a second circuit portion connecting the DC/DC convertor and the electric load, a bypass circuit portion connecting the first circuit portion and the second circuit portion, bypassing the DC/DC convertor, is provided, a switch operative to close for short-circuiting the bypass circuit portion when a voltage difference between the first circuit portion and the second circuit portion is a specified value or smaller and open when the voltage difference is greater than the specified value is provided, and the control device is further configured to detect a deterioration state of the battery and change the voltage of the power-storage device during the soak in accordance with the deterioration state of the battery detected. Thereby, since the voltage of the capacitor during the soak is changed in accordance with the deterioration state of the battery detected, for example, changed from a high voltage to a low voltage when the deterioration state of the battery detected is determined such that the battery deteriorates, it can be properly avoided that a supply voltage to the electric load decreases below an operation-guarantee voltage in a case in which the power to be supplied to the electric load is provided only from the battery.

According to another aspect of the present invention, there is provided a control method of a power-source apparatus for a vehicle which comprises a generator driven by an engine and generating power and a power-storage device storing the power generated by the generator thereat and supplying the power stored thereat to an electric load, the method comprising steps of detecting a deterioration state of the power-storage device, and changing a voltage of the power-storage device during a soak in accordance with the deterioration state of the power-storage device detected such that the voltage of the power-storage device is changed from a high voltage to a low voltage when the deterioration state of the power-storage device detected is determined such that the power-storage device deteriorates. This control method of a power-source apparatus for a vehicle can provide substantially the same effects as those of the above-described power-source apparatus for a vehicle according to the present invention.

Other features, aspects, and advantages of the present invention will become apparent from the following description which refers to the accompanying drawings.

DETAILED DESCRIPTION OF THE INVENTION

Hereinafter, a preferred embodiment of the present invention will be described.

Figure 1:
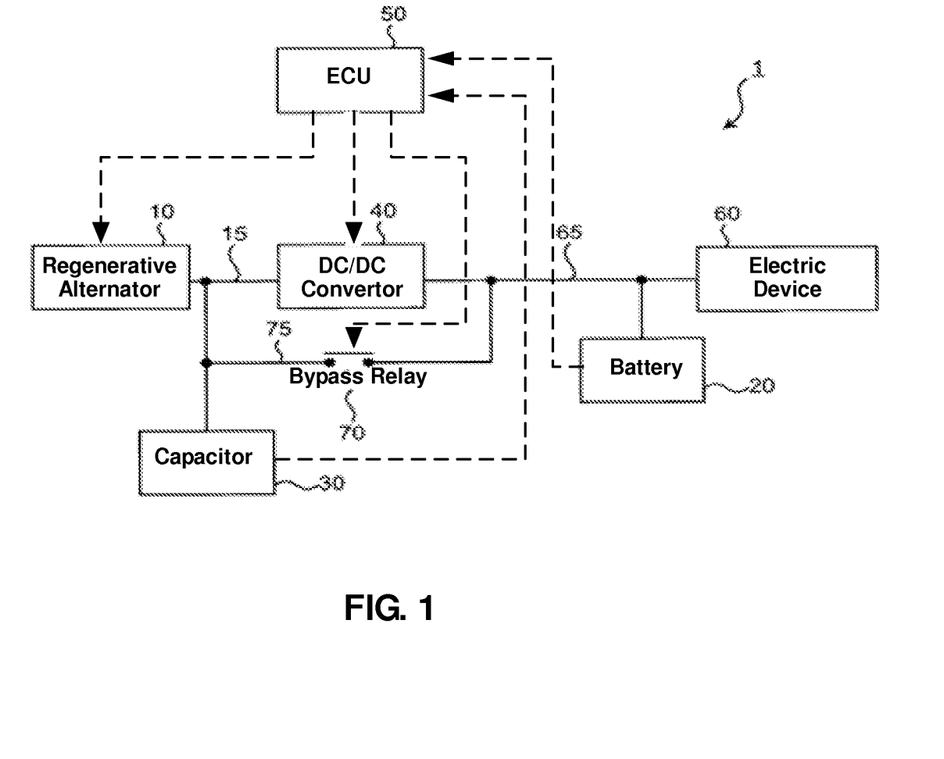
FIG. 1 is a block diagram of a deceleration-regeneration system, to which a power-source apparatus for a vehicle and a control method of the same according to the present invention are applied.

FIG. 1 shows a deceleration-regeneration system 1, to which a power-source apparatus for a vehicle and a control method of the same according to the present embodiment are applied. The deceleration-regeneration system 1 comprises a regenerative alternator 10 which is capable of a deceleration-regeneration power generation conducted at the time of deceleration of the vehicle and a normal power generation conducted by a drive of an engine (not illustrated), a battery 20, a capacitor 30 which is capable of storing the power generated by the regenerative alternator 10, a DC/DC convertor 40 which controls a power supply to an electric device 60 comprising various kinds devices of the vehicle, a control unit 50 (hereinafter, referred to as "ECU 50") which outputs control signals for controlling the deceleration-regeneration system 1, and a bypass relay 70 which is provided at a bypass circuit portion 75 bypassing the DC/DC convertor 40.

The regenerative alternator 10 and the DC/DC convertor 40 are connected via a first circuit portion 15, and the capacitor 30 is connected to this first circuit portion 15. Further, the DC/DC convertor 40 and the electric device 60 are connected via a second circuit portion 65, and the battery 20 is connected to this second circuit portion 65.

Moreover, the bypass relay 70 is provided, bypassing the DC/DC convertor 40, so as to open for disconnecting the first circuit portion 15 and the second circuit portion 65, or close for connecting, i.e., short-circuiting the first circuit portion 15 and the second circuit portion 65.

The regenerative alternator 10, which is driven by the engine with a belt, is a variable voltage type of alternator which efficiently regenerates the kinetic energy at the time of deceleration of the vehicle and the like for power regeneration. The voltage of the regenerative alternator 10 can be increased up to the maximum 25 V for an efficient power supply and storage.

The battery 20 is an ordinary Pb (Lead) battery.

The capacitor 30 is a high-capacity and low-resistance electric double-layer capacitor (EDLC) which is capable of storing a high-capacity regenerated electric energy quickly and taking out the stored electric energy efficiently for use. Compared with a Li (Lithium) ion battery used for electric automotive vehicles or the ordinary Pb battery, the capacitor 30 is more advantageous in the quick power-storage (for several seconds during a vehicle traveling at the speed of 50-60 km/h), the unlimited depth of discharge, the semi-permanent durability, and the like.

The DC/DC convertor 40 outputs its voltage with decreasing of the maximum DC 25 V down to DC 14 V, and is capable of flowing up to a specified output current (up to a permissible output current-value (permissible limit value) of 50 A). In general, the DC/DC converter having a lager capacity may be larger sized and more expensive.

Further, the DC/DC convertor 40 is configured to be capable of supplying part of the power stored at the capacitor 30 to the electric device 60 by way of the DC/DC convertor 40 and adjusting the amount of the above-described power supplied to the electric device 60. Specifically, the voltage of the capacitor 30 is generally controlled so as to be adjustable at a specified appropriate voltage (target voltage) through a feedback control. That is, the amount of discharged power from the capacitor 30 to the electric device 60 and the battery 20 by way of the DC/DC convertor 40 is adjusted by a control signal outputted from the above-described ECU 50 so that the voltage of the capacitor 30 can become the above-described specified appropriate voltage, i.e., the target voltage.

The ECU 50 manages and controls an operation of the deceleration-regeneration system 1 totally.

The electric device 60 comprises, for example, a lamp, defroster, blower, seat heater, fan, ignition, engine control unit, DSC (dynamic stability control), EPA (electromotive power steering), power window, and so on.

According to the deceleration-regeneration system 1, the power generation by the regenerative alternator 10 is not conducted as long as the sufficient power remains at the battery 20 or the capacitor 30 even at the time of idling stop or accelerator ON. Thereby, this remaining power is used properly, so that the power generation by the engine consuming the fuel can be restrained properly, thereby improving the fuel economy.

Further, when the vehicle travels in an urban area (town), acceleration and deceleration of the vehicle may happen often, so that the power may be stored and kept at the capacitor 30 all the time without shortage. Thereby, the necessary power for the vehicle traveling may be obtained mostly from the deceleration regenerative energy.

Next, a specific control method of the power-source apparatus for a vehicle for changing the voltage (hereinafter, referred to as "target voltage") of the capacitor 30 when the ignition switch is turned OFF (hereinafter, referred to as "IG-OFF") by the ECU 50 and thereby the engine is stopped (hereinafter, referred to as "during the soak") will be described referring to FIGS. 2 and 3.

First, the changing of the target voltage of the capacitor 30 during the soak will be described referring to the flowchart of FIG. 2.

A current capacity C of the capacitor 30 is measured in step S1. In the next step S2, a capacity $C_{NEXT}$ of the capacitor 30 at the timing a next measuring of the capacity of the capacitor 30 is conducted is estimated based on the current capacity C which has been measured so far, and it is determined whether or not this estimated capacity $C_{NEXT}$ is a specified capacity provided to ensure an operation-guarantee capacity $C_{MIN\_10}$ at the timing a term of operation guarantee (10 years, for example) of the capacitor 30 passes (hereinafter, referred to as "provision-value $C_{MIN}$") or greater. This provision-value $C_{MIN}$ has been previously memorized according to a use term of the power source. When it is not determined that the estimated capacity $C_{NEXT}$ is the provision-value $C_{MIN}$ or greater, that is—it is determined that the capacitor 30 so deteriorates that the current target voltage of the capacitor 30 may be insufficient and lower than the operation-guarantee capacity $C_{MIN_{10}}$, the target voltage $V_{CAP\_SOAK}$ of the capacitor 30 during the soak is set at a specified low voltage $V_{CAP\_SOAK\_LOW}$, e.g., 15 V in the next step S6. The above-described estimation of the capacity will be described specifically below.

Meanwhile, when it is determined in the step S2 that the capacity $C_{NEXT}$ is the provision-value $C_{MIN}$ or greater, a minimum voltage $V_{BAT\_MIN\_SOAK}$ of the battery 20 is esti-mated in step 3. The estimation manner of this minimum voltage $V_{BAT\_MIN\_SOAK}$ of the battery 20 will be described specifically below.

Next, it is determined in step S4 whether or not the estimated-minimum voltage $V_{BAT\_MIN\_SOAK}$ of the battery 20 is a previously-provided minimum voltage (hereinafter, referred to as "operation-guarantee voltage $V_{BAT\_MIN\_RUN}$"), e.g., 11.5 V or greater. When it is not determined that the minimum voltage $V_{BAT\_MIN\_SOAK}$ is the operation-guarantee voltage $V_{BAT\_MIN\_RUN}$ or greater, that is—it is determined that the battery 20 so deteriorates that the sufficient power may not be ensured at the time of IG-ON, the target voltage $V_{CAP\_SOAK}$ of the capacitor 30 during the soak is set in the step S6 at the low voltage $V_{CAP\_SOAK\_LOW}$ (e.g., 15 V).

Herein, the above-described operation-guarantee voltage $V_{BAT\_MIN\_RUN}$ is previously set at a specified vale such that if the minimum voltage $V_{BAT\_MIN\_SOAK}$ of the battery 20 is lower than this operation-guarantee voltage $V_{BAT\_MIN\_RUN}$, any sufficient power may not be supplied to the electric device 60.

Meanwhile, when it is determined in the step S4 that the minimum voltage $V_{BAT\_MIN\_SOAK}$ of the battery 20 is the operation-guarantee voltage $V_{BAT\_MIN\_RUN}$ or greater, the target voltage $V_{CAP\_SOAK}$ of the capacitor 30 during the soak is set in the next step S5 at a specified high voltage $V_{CAP\_SOAK\_HIGH}$, e.g., 20 V.

That is, until the capacitor 30 or the battery 20 come to deteriorate, the target voltage $V_{CAP\_SOAK}$ of the capacitor 30 during the soak is set at the high voltage $V_{CAP\_SOAK\_HIGH}$, (e.g., 20 V), whereas after the capacitor 30 or the battery 20 has come to deteriorate, the target voltage $V_{CAP\_SOAK}$ of the capacitor 30 during the soak is changed to the low voltage $V_{CAP\_SOAK\_LOW}$, (e.g., 15 V).

Herein, the measuring of the capacity C of the capacitor 30 in the step S1 may be preferably conducted periodically, for example, every month. A specific manner of this measuring is that the power stored at the capacitor 30 is discharged to any resistance having a predetermined resistance value and then it is measured how much the voltage of the capacitor 30 decreases for a specified period of time. The capacity C of the capacitor 30 can be measured based on the amount of the decrease of the capacitor's voltage. However, the capacity C of the capacitor 30 may be estimated indirectly in a known manner, in place of the above-described direct measuring.

Further, in place of the above-described manner in which the capacitor's target voltage is changed in accordance with the comparison result of the estimated capacity $C_{NEXT}$ with the provision-value $C_{MIN}$, an alternative manner may be applied. That is, the changing rate of the capacity is calculated from the current capacity C and the previously-measured capacity, and the capacity at the timing the operation-guarantee term passes is estimated based on the calculated changing rate of the capacity, so that the capacitor's target voltage during the soak $V_{CAP\_SOAK}$ may be changed to the specified low voltage $V_{CAP\_SOAK\_LOW}$, e.g., 15 V, when it is determined that the estimated capacity is lower than the target capacity $C_{MIN\_10}$ at the timing the operation-guarantee term passes.

Next, the manner of estimating the minimum voltage of the battery 20 will be described specifically referring to FIG. 3. FIG. 3 is a flowchart schematically showing the estimation of the minimum voltage of the battery, which is a subroutine of the main routine of FIG. 2.

First, in step S11, a SOC (state of charge) showing a current charging state of the battery 20 during the vehicle traveling is measured continuously, and when the vehicle is stopped and then the IG switch is turned OFF (hereinafter, referred to as "IG-OFF"), a value (%) of the SOC measured lastly during the vehicle traveling (hereinafter, referred to as "$SOC_{OFF}$") is memorized at the ECU 50.

Then, in the next step S12, a value of the SOC of the battery 20 at the timing the next IG is turned ON (hereinafter, referred to as "IG-ON") (hereinafter, referred to as "$SOC_{ON}$") is estimated by subtracting a $SOC_{SOAK}$ which has been previously provided for each vehicle and corresponds to a deceased value of the SOC due to the dark (idling) current (i.e., the electricity consumed during the soak) from the above-described memorized $SOC_{OFF}$.

Subsequently, in step S13, the estimated $SOC_{ON}$ is converted to an electromotive force $E_{BAT\_ON}$ of the battery 20 with a preset conversion map or the like, for example.

In the next step S14, an internal resistance $R_{BAT}$ of the battery 20 is estimated. Then, in the next step S15, a voltage decrease $V_{BAT\_DROP}$ of the battery 20 is estimated from multiplication of the estimated $R_{BAT}$ and a preset maximum value $I_{ON\_MAX}$ of the required electricity flowing instantly at the tine of IG-ON (i.e., $R_{BAT} \times I_{ON\_MAX}$).

Figure 2:
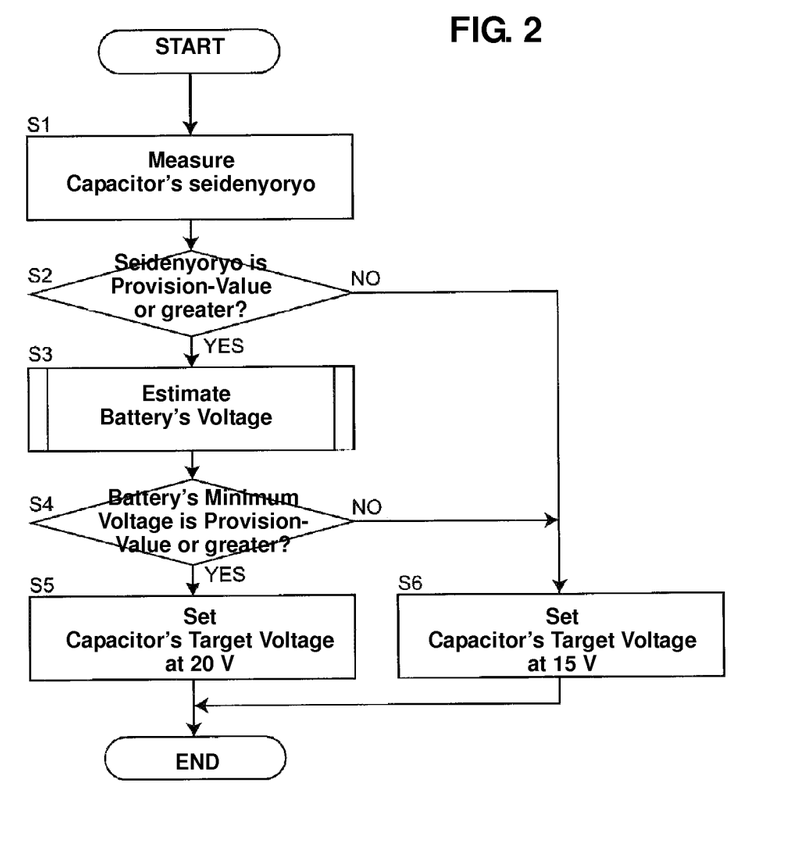
FIG. 2 is a flowchart schematically showing an operation of the power-source apparatus for a vehicle and the control method of the same according to the present invention.
Figure 3:
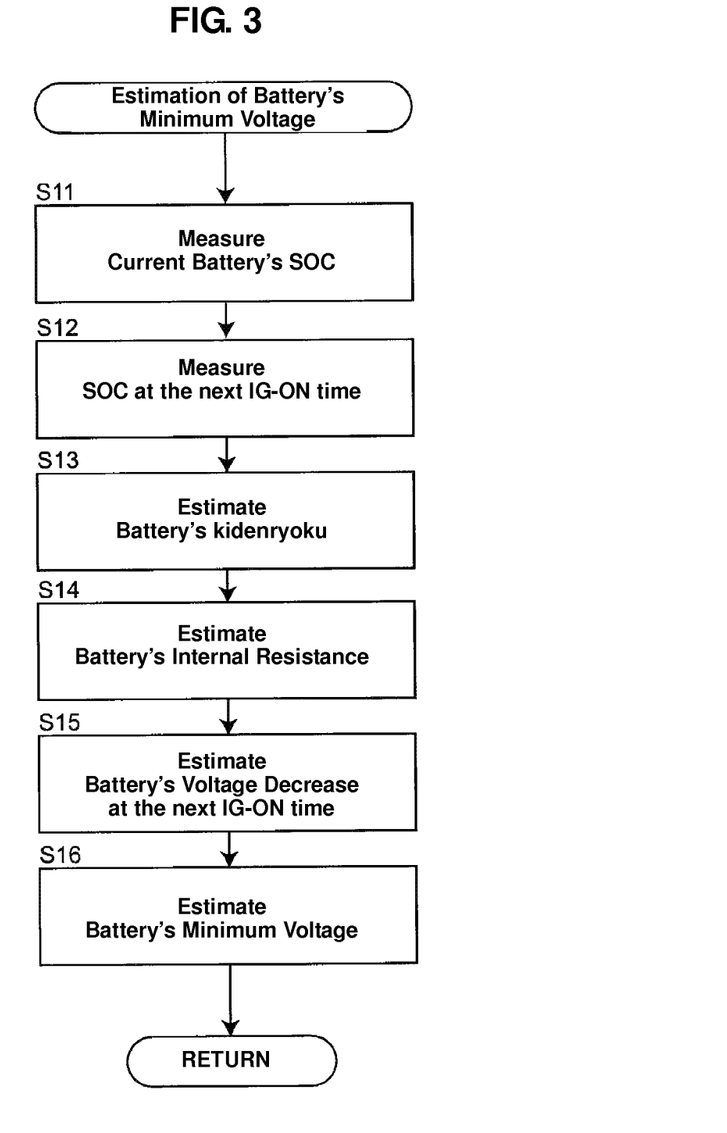
FIG. 3 is a flowchart schematically showing an operation of the power-source apparatus for a vehicle and the control method of the same according to the present invention when a minimum voltage of a battery of FIG. 2 is estimated.

Lastly, in step S16, a minimum voltage $V_{BAT\_MIN\_SOAK}$ of the battery 20 is calculated by subtracting the voltage decrease $V_{BAT\_DROP}$ from the electromotive force $E_{BAT\_ON}$ (i.e., $E_{BAT\_ON} - V_{BAT\_DROP}$), and then the control is returned to the main routine of FIG. 2.

The operation of the ECU 50 controlling the deceleration-regenerative system 1 based on the above-described flowcharts according to the present embodiment will be described referring to FIGS. 4 and 5.

Figure 4:
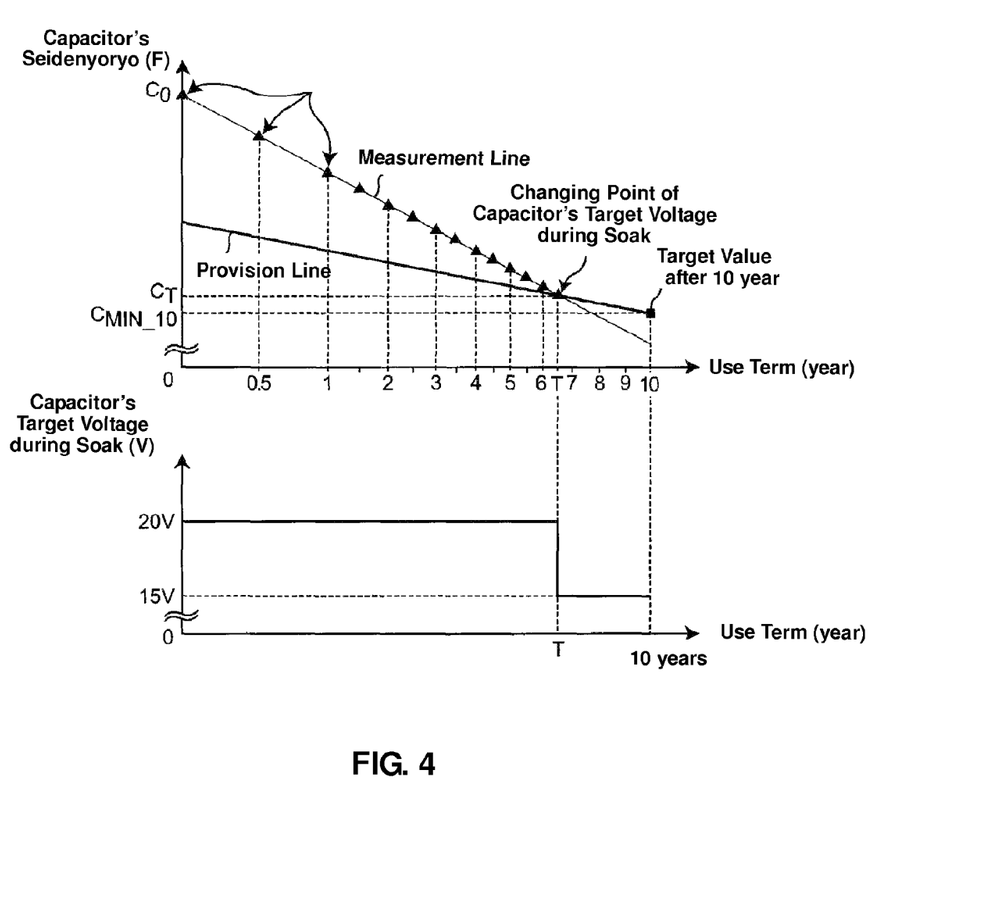
FIG. 4 are time charts describing changing of a target voltage of a capacitor during a soak in accordance with a deterioration state of the capacitor.

FIG. 4 are time charts describing changing of the target voltage of the capacitor during the soak in accordance with the capacity of the capacitor 30. The axis of abscissa of the time charts means the use term (year) of the capacitor 30 from the use beginning, and the axes of ordinates respectively mean the capacity C (F) of the capacitor 30 and the capacitor's target voltage during the soak $V_{CAP\_SOAK}$ (V).

Specifically, the axis of abscissa of the time charts shows a square root of the use term. This is because the square root of the use term and the capacity of the capacitor generally have a liner correlative relationship, so that it may be easier to describe.

A two-straight-line graph of a measurement line and a provision line which respectively slant downward toward the right is drawn in an upper time chart.

This measurement line is formed (made) in such a manner that the capacitor's target voltage during the soak $V_{CAP\_SOAK}$ is set at 20 V, the capacity C is periodically measured for a period of time from 0 year to T years of the use term, for example, every month, then a straight line approximating to plural points of these measured values is drawn, and this straight line is extended to 10 years of the use term, for example.

Accordingly, the gradient of the measurement line means a speed of the capacity of the capacitor 30 decreasing as the time passes, that is, a progress peed of the deterioration of the capacitor 30.

Meanwhile, the above-described provision line is formed (made) in such a manner that the capacitor's capacity $C_{MIN\_10}$ capable of providing an effective vehicle traveling having a required fuel economy even at the timing the 10-year use term has passed is preset as the target capacity at the 10-year timing, and then the line is drawn straightly back to the use beginning from the 10-year timing with a specified gradient, which may have been previously obtained from some experiments or the like, corresponding to a decrease rate of the capacity in the case of continuously using with the capacitor's target voltage during the soak $V_{CAP\_SOAK}$ of 15 V. That is, the provision-value $C_{MIN}$ of the capacity in the case in which the capacitor's target voltage $V_{CAP\_SOAK}$ is set at the low voltage (15 V) is continuously drawn (plotted) on a graph so that the capacitor's target capacity $C_{MIN\_10}$ can be achieved (provided) at the timing the operation-guarantee term (10 years) passes.

The capacitor's target voltage during the soak $V_{CAP\_SOAK}$ is set at 20 V, and then the use of vehicle is started. The capacity C of the capacitor 30 is measured every month from the use beginning (S1), and the actual measured values are memorized in the ECU 50. The capacity $C_{NEXT}$ after one month is estimated based on the data of the capacity C which have been measured and memorized so far.

Herein, the above-described estimation is the same as that the above-described measurement line is formed (made) based on the actual measured values on the graph and then the capacity after one month is obtained based on this measurement line.

The estimated capacity $C_{NEXT}$ after one month and the provision-value $C_{MIN}$ at this timing are compared with each other (S2), and when it is not determined that the capacity $C_{NEXT}$ is the provision-value $C_{MIN}$ or greater (i.e., $C_{NEXT} < C_{MIN}$), the use term T when the capacity becomes equal to the provision-value $C_{MIN}$ is calculated.

Herein, this calculation is the same as that an intersecting point (T, $C_1$) where the measurement line and the provision line cross each other is obtained on the graph (see "changing point of the capacitor's target voltage during the soak" on the graph), wherein $C_1$ means the capacity at the timing of the use term T.

Then, when the time reaches this calculated use term T, the capacitor's target voltage during the soak $V_{CAP\_SOAK}$ is changed from 20 V to 15 V (S6).

The measuring of the capacitor's capacity C continues after the changing of the capacitor's target voltage $V_{CAP\_SOAK}$. While no illustration is provided, the actual measured values of the capacity C after the changing are plotted substantially on the provision line, so that the target capacity $C_{MIN\_10}$ is obtained when the 10-year use term passes.

Thus, according to the present embodiment, the improvement of the fuel economy by means of the idling stop, for example, can be achieved through the setting of the target voltage at the initial use stage at the high voltage, and the necessary durability of the capacitor 30 can be ensured for a long period of time through the changing of the target voltage from the high voltage to the low voltage when the deterioration of the capacitor 30 progresses to a certain degree.

Next, the operation of changing the capacitor's target voltage during the soak $V_{CAP\_SOAK}$ in accordance with the deterioration state of the battery 20 and the like will be described specifically referring to FIG. 5.

Figure 5:
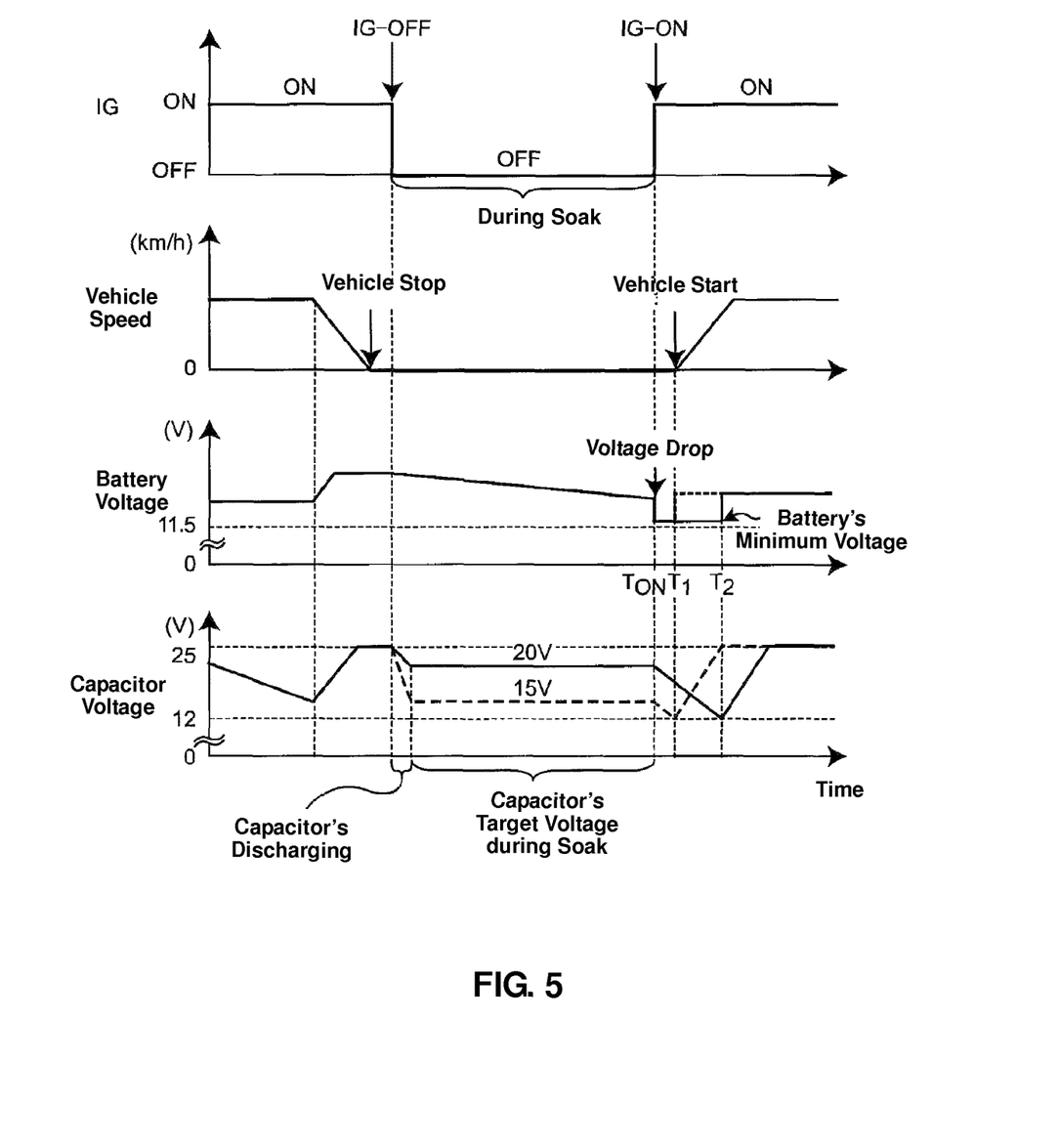
FIG. 5 are time charts describing changing of the target voltage of the capacitor during the soak in accordance with a deterioration state of a battery.

FIG. 5 are time charts describing the changing of the capacitor's target voltage during the soak $V_{CAP\_SOAK}$ in accordance with the deterioration state of the battery 20 and the like, which respectively show changes of the IG switch, the vehicle speed, the battery voltage, and the capacitor's voltage relative to the time.

First, the current SOC of the battery 20 is continuously measured during the vehicle traveling (S11). When the vehicle starts decelerating, the deceleration regeneration by the regenerative alternator 10 is conducted, so that the power is stored at the battery 20 and the capacitor 30.

Then, the vehicle stops, and the engine is stopped with the IG-OFF, whereby the soak state occurs. The battery's minimum voltage $V_{BAT\_MIN\_SOAK}$ is estimated at the time of IG-OFF based on the $SOC_{OFF}$ which is the value of the SOC measured lastly during the vehicle traveling (S3). It is determined whether or not the battery's minimum voltage $V_{BAT\_MIN\_SOAK}$ is the operation-guarantee voltage $V_{BAT\_MIN\_RUN}$ or greater (S4). The capacitor's target voltage during the soak $V_{CAP\_SOAK}$ is set at the proper voltages to ensure the sufficient power by the battery 20 at the nest time of IG-ON (S5, S6). Until the voltage decreases to this capacitor's target voltage during the soak $V_{CAP\_SOAK}$, the power stored at the capacitor 30 is discharged to the electric device 60 and the battery 20 by way of the DC/DC convertor 40.

Since the power of the battery 20 is consumed by the dark (idling) current during the soak, the voltage of the battery 20 decreases gradually. Further, the capacitor 30 keeps the capacitor's target voltage during the soak $V_{CAP\_SOAK}$ which has been set at the time of IG-OFF during the soak.

The battery 20 has the voltage decrease $V_{BAT\_DROP}$ at the time of IG-ON. This is because since the power stored at the capacitor 30 does not flow through the bypass circuit portion 75 until the voltage of the capacitor 30 which has been kept at the target voltage $V_{CAP\_SOAK}$ of 15 V or 20 V during the soak drops around to the regulated voltage 12 V of the electric device 60 at the time of IG-ON, the power for the electric device 60 is supplied only from the battery 20, so that if the electric load is large, a large amount of electricity $I_{ON\_MAX}$ flows to the electric device 60 from the battery 20 at the time of IG-ON and the voltage of the battery 20 decreases due to the internal resistance $R_{BAT}$ of the battery 20.

Herein, the minimum voltage of the battery 20 at the time of voltage decrease is substantially equal to the minimum voltage $V_{BAT\_MIN\_SOAK}$ estimated at the time of IG-OFF, and the voltage of the capacitor 30 is kept at the capacitor's target voltage during the soak $V_{CAP\_SOAK}$ which can ensure the sufficient power only by means of the battery 20 at the time of IG-ON. Therefore, the minimum voltage does not decrease below the operation-guarantee voltage $V_{BAT\_MIN\_RUN}$ (e.g., 11.5 V) of the battery 20, so that the electric device 60 operates normally and the vehicle starts shortly.

Herein, if the minimum voltage decreases below the operation-guarantee voltage $V_{BAT\_MIN\_RUN}$ of the battery 20, any sufficient power may not supplied to the electric device 60, so that abnormal states may occur. For example, a power steering may not operate normally, which may cause a heavy handling operation improperly, or a headlight may not work properly.

When the difference of the voltage of the capacitor 30 and the voltage of the battery 20 becomes a specified value or smaller, the bypass relay 70 is turned ON, and thereby the first circuit portion 15 and the second circuit portion 65 are short-circuited. The regenerative alternator 10 conducts the normal power generation at the low voltage (14 V, for example), and the power is supplied to the electric device 60 via the DC/DC convertor 40. And, the battery 20 is charged with the large electricity from the regenerative alternator 10 by way of the bypass circuit portion 75.

Accordingly, in a case in which the capacitor's target voltage during the soak $V_{CAP\_SOAK}$ is set at 20 V, the power supply only from the battery 20 needs to be supplied for the period of time $T_{ON}$–$T_2$. However, in a case in which the capacitor's target voltage during the soak $V_{CAP\_SOAK}$ is set at 15 V, the above-described power supply needs to be conducted just for the period of time $T_{ON}$ to $T_1$, so that the power of the battery 20 to be consumed during this period of time becomes preferably smaller. Herein, the above-described $T_{ON}$ means the timing the voltage of the battery 20 drops due to the IG-ON, the above-described $T_1$ means the timing the voltage of the capacitor 30 decreases from 15 V to 12 V, and the above-described T2 means the timing voltage of the capacitor 30 decreases from 20 V to 12V.

As described above, since the voltage of the capacitor 30 during the soak is changed from the high voltage to the low voltage when the battery 20 deteriorates and thereby the power to be stored at the battery 20 decreases, or the electric load at the time of IG-ON is large, the burden of the battery 20 at the time of IG-ON can be reduced, so that it can be properly avoided that the supply voltage to the electric device 60 decreases below the operation-guarantee voltage.

The present invention should not be limited to the above-described embodiment, and any other modifications or improvements may be applied within the scope of a sprit of the present invention.

For example, while the measuring of the capacitor 30 is conducted every month in the above-described embodiment, the measuring may be conducted every day and the changing of the capacitor's target voltage during the soak may be conducted at the timing the current deterioration state has reached below the provision-value. Further, the conducting of the measuring of the capacitor 30 should not be limited to the above-described time of the soak.

Moreover, while the changing of the capacitor's target voltage during the soak is conducted from the high voltage to the low voltage, the capacitor's target voltage during the soak may be changed from a specified low voltage to a specified high voltage for the improvement of the fuel economy when the capacity of the capacitor 30 or the battery 20 is sufficiently enough.

Also, while the capacitor's target voltage during the soak is changed from the high voltage to the low voltage only at one time, it may be changed at plural times, for example, from a specified high voltage to a specified low violated by way of a specified middle voltage. Further, while the candidate voltage values (15 V and 20 V) of the target voltage are predetermined, those may be obtained from proper calculations at the time of changing.

Moreover, the battery 20 may be comprised of any other rechargeable (secondary) battery than the Pb battery. Any other power-storage device than the capacitor 30 may be used.

Also, while the regenerative alternator 10 is used as the regenerative generator in the above-described embodiment, a motor generator or the like may be used in place of the regenerative alternator 10. While the bypass relay 70 is used as the switch, a semiconductor switch may be used alternatively.

What is claimed is:
1. A power-source apparatus for a vehicle, comprising:
a generator driven by an engine and generating power;
a power-storage device storing the power generated by the generator thereat and supplying the power stored thereat to an electric load; and
a control device configured to detect an actual progress speed of deterioration of the power-storage device which corresponds to an actual decreasing speed of a capacity of the power-storage device relative to the time, compare the actual progress speed of deterioration of the power-storage device detected with a target progress speed of deterioration of the power-storage device which is preset and capable of ensuring a required operation-guarantee term of the power-storage device, and change a voltage of the power-storage device during a soak in accordance with said comparison of the actual progress speed of deterioration with the target progress speed of deterioration of the power-storage device such that the voltage of the power-storage device during the soak is changed to a lower voltage when the actual progress speed of deterioration is faster than the target progress speed of deterioration; and a battery, wherein said power-storage device is a capacitor, and said detection of the actual progress speed of deterioration of the capacitor by said control device is conducted based on the capacity of the capacitor which is measured every specified period of time during the soak; and said power-storage device is coupled to a first circuit portion connecting said generator and said DC/DC convertor, said battery is coupled to a second circuit portion connecting the DC/DC convertor and the electric load, a bypass circuit portion connecting said first circuit portion and said second circuit portion, bypassing the DC/DC convertor, is provided, a switch operative to close for short-circuiting the bypass circuit portion when a voltage difference between the first circuit portion and the second circuit portion is a specified value or smaller and open when said voltage difference is greater than said specified value is provided, and said control device is further configured to detect a deterioration state of the battery and change the voltage of the power-storage device during the soak in accordance with the deterioration state of the battery detected.

2. The power-source apparatus for a vehicle of claim 1, further comprising a DC/DC convertor coupled between said power-storage device and said electric load, wherein said DC/DC convertor is configured to be capable of supplying part of the power stored at the power-storage device to the electric load via the DC/DC convertor and adjusting the amount of said power supplied to the electric load, and said control device comprises a control unit which outputs, to the DC/DC convertor, a control signal for adjusting said amount of the power supplied to the electric load via the DC/DC convertor.

3. The power-source apparatus for a vehicle of claim 1, wherein said control device changes the voltage of the capacitor during the soak from a high voltage to a low voltage when the deterioration state of the battery detected is determined such that the battery deteriorates.

4. A control method of a power-source apparatus for a vehicle which comprises a generator driven by an engine and generating power and a power-storage device storing the power generated by the generator thereat and supplying the power stored thereat to an electric load and a battery, wherein said power-storage device is coupled to a first circuit portion connecting said generator and said DC/DC convertor, said battery is coupled to a second circuit portion connecting the DC/DC convertor and the electric load, a bypass circuit portion connecting said first circuit portion and said second circuit portion, bypassing the DC/DC convertor, is provided, a switch operative to close for short-circuiting the bypass circuit portion when a voltage difference between the first circuit portion and the second circuit portion is a specified value or smaller and open when said voltage difference is greater than said specified value is provided; the method comprising steps of:

detecting an actual progress speed of deterioration of the power-storage device which corresponds to an actual decreasing speed of a capacity of the power-storage device relative to the time;

comparing the actual progress speed of deterioration of the power-storage device detected with a target progress speed of deterioration of the power-storage device which is preset and capable of ensuring a required operation-guarantee term of the power-storage device; and changing a voltage of the power-storage device during a soak in accordance with said comparison of the actual progress speed of deterioration with the target progress speed of deterioration of the power-storage device such that the voltage of the power-storage device during the soak is changed from a high voltage to a low voltage when the actual progress speed of deterioration is faster than the target progress speed of deterioration;

wherein said power-storage device is a capacitor and said detecting of the actual progress speed of deterioration includes detecting the actual progress speed of the capacitor by said control device conducted based on the capacity of the capacitor which is measured every specified period of time during the soak.

* * * * *